United States Patent [19]

Spinner

[11] 4,064,679
[45] Dec. 27, 1977

[54] COMBINATION LAWN MOWER, SNOW BLOWER AND LAWN SWEEPER

[75] Inventor: David Spinner, Willowdale, Canada

[73] Assignee: Unisette Realty Ltd., Willowdale, Canada

[21] Appl. No.: 677,631

[22] Filed: Apr. 16, 1976

[30] Foreign Application Priority Data

May 21, 1975 Canada .................................. 227451

[51] Int. Cl.² .................... A01D 53/00; A01D 51/00; A01D 35/24
[52] U.S. Cl. ........................................ 56/2; 56/16.4; 37/43 E
[58] Field of Search ................ 56/2, 249.5, 13.3, 249; 37/43 E

[56] References Cited

U.S. PATENT DOCUMENTS

| 796,811 | 8/1905 | Caldwell et al. .......................... 56/2 |
| 1,619,851 | 3/1927 | Caley ........................................ 56/2 |
| 2,770,938 | 11/1956 | Kiernan ..................................... 56/2 |
| 3,690,047 | 9/1972 | Thoen et al. ........................... 56/13.3 |
| 3,783,592 | 1/1974 | Schraut ................................... 56/13.3 |

FOREIGN PATENT DOCUMENTS

| 408,408 | 11/1942 | Canada .............................. 56/249.5 |
| 427,824 | 5/1945 | Canada .............................. 56/249.5 |
| 526,849 | 6/1956 | Canada .............................. 56/249.5 |

Primary Examiner—Russell R. Kinsey
Attorney, Agent, or Firm—Rogers, Bereskin and Parr

[57] ABSTRACT

A multi-use lawn care machine which can be used as a lawn mower, lawn sweeper or snow blower. The machine has a generally cylindrical housing to hold the tool (a snow blower reel, lawn mower reel, or lawn sweeper attachment) in use. One side plate of the housing is lateraly removable, permitting access to and disconnection of the tool. A front wheel is mounted on the removable side plate. A front cover is removably attached to close the front of the housing when the machine is used as a lawn mower or lawn sweeper.

7 Claims, 10 Drawing Figures

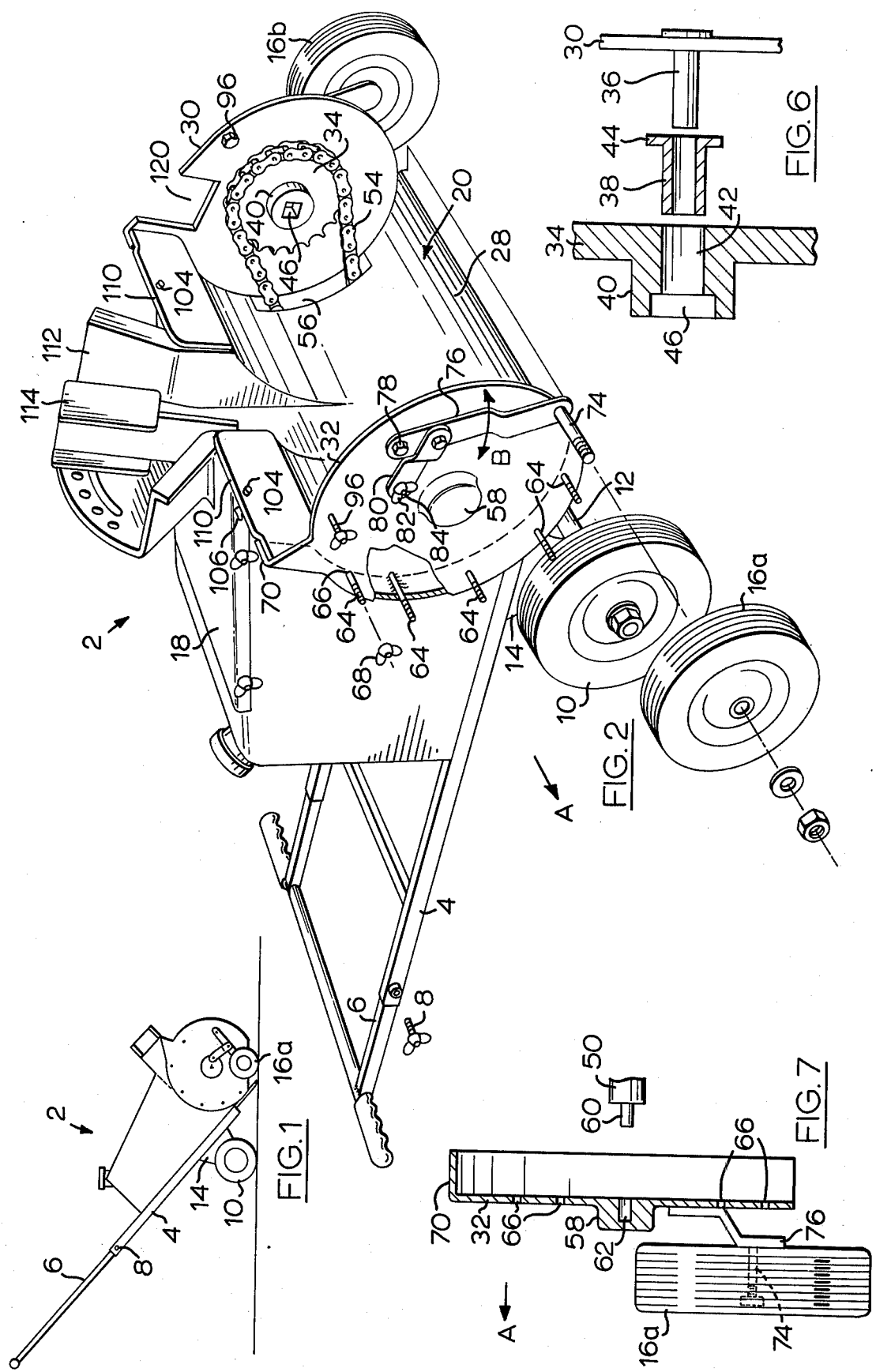

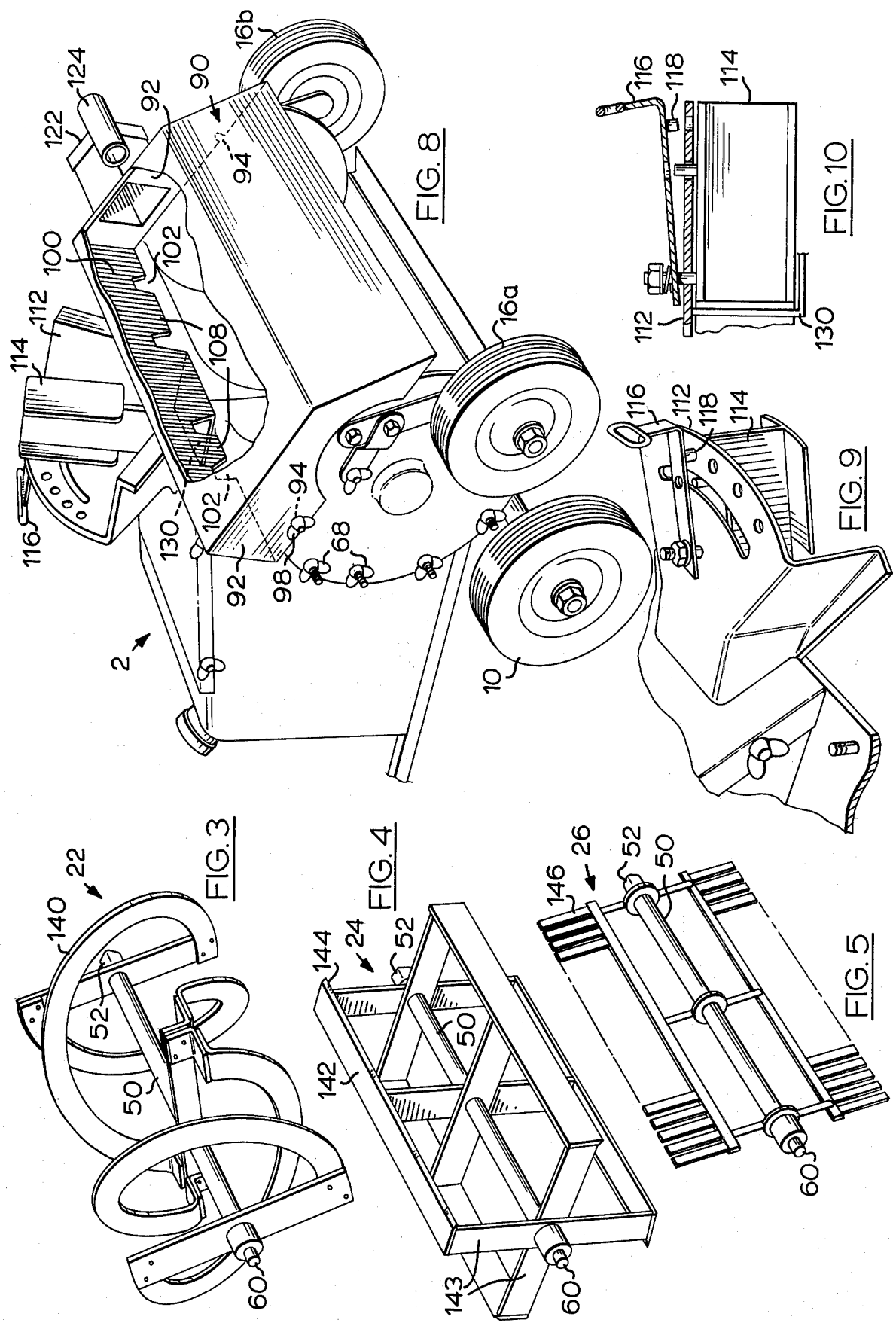

COMBINATION LAWN MOWER, SNOW BLOWER AND LAWN SWEEPER

This invention relates to a multi-use lawn care machine. The machine of the invention may be used, depending upon the tool inserted in it, as a lawn mower, lawn sweeper or snow blower, or it may be used for any two of these functions.

At the present time, home owners who must cut their lawns, rake leaves and shovel snow may purchase separate machines for each of these tasks. No one machine will perform all three jobs or even adequately perform any two of the jobs. Some lawn mowers will pick up some of the debris on a lawn, but they are not able to pick up debris embedded in the lawn.

Various attempts have been made to devise a machine which will perform at least two of the tasks indicated above. A typical example is shown in U.S. Pat. No. 3,286,376, which shows an attempt to combine a lawn mower and snow blower. Unfortunately, the device shown in the patent is extremely complex and expensive and provides little if any advantage as compared with having two separate machines.

Accordingly, it is an object of the present invention to provide a multi-use lawn care machine which can perform at least two of the tasks indicated above, and preferably can perform all three tasks of lawn mowing, lawn sweeping and snow blowing, depending on the tool inserted in it. In its broadest aspect, the invention provides a multi-use lawn care machine comprising:

a. a tool housing adapted to receive an attachment tool, said housing comprising a back plate, and a first fixed side plate closing one side of said housing, b. drive means mounted on said first side plate for supporting and driving one end of said tool, said one end of said tool being removably connected to said drive means and said one end of said tool and said drive means containing co-operating means for transmitting rotary drive motion from said drive means to said tool, c. a second side plate for closing the other end of said housing, d. means removably connecting said second side plate to said device for disconnection of said second side from said device, e. said second side plate and said tool having co-operating means aligned with said drive means for rotatably supporting the other end of said tool on said second side plate, said cooperating means including means permitting disconnection of said other end of said tool from said second side plate, f. and means for applying power to said drive means.

Further objects and advantages of the invention will appear from the following description, taken together with the accompanying drawings, in which:

FIG. 1 is a side view of a multi-use lawn care machine according to the invention;

FIG. 2 is a front perspective view, partly exploded, of the machine of FIG. 1;

FIG. 3 is a perspective view of a snow blower reel for use with the machine of FIGS. 1 and 2;

FIG. 4 is a perspective view of a lawn mower reel for use with the machine of FIGS. 1 and 2;

FIG. 5 is a perspective view of a lawn sweeper attachment for use with the machine of FIGS. 1 and 2;

FIG. 6 is a side sectional exploded view showing the manner in which the sprocket of FIG. 2 is mounted;

FIG. 7 is a side view of the removable side plate of the machine of the FIGS. 1 and 2, with the wheel mounting arm partly broken away for clarity;

FIG. 8 is a perspective view similar to that of FIG. 2 but showing a removable front cover plate in position;

FIG. 9 is a perspective view of a snow blower discharge chute of the FIGS. 1 and 2 device; and FIG. 10 shows a control lever for the discharge chute of FIG. 9.

Reference is first made to FIGS. 1 and 2, which show a multi-use lawn care device according to the invention and generally indicated at 2. The device 2 includes a frame 4, a telescopic handle 6 which may be slid into or out of the frame 4 and the position of which is controlled by a tightening screw 8, and a pair of rear wheels 10. The rear wheels 10 are mounted on a full cross shaft 12 which is journalled in supports 14 which depend from the frame. The device also includes front wheels 16a, 16b, mounted in a manner to be described, and a motor (not shown) mounted on the frame and enclosed by a motor cover 18. The motor may be gasoline or electric.

The device 2 includes a tool housing generally indicated at 20. The housing 20 is capable of receiving various kinds of tools, e.g. a snow blower reel 22 (FIG. 3), a lawn mower reel 24 (FIG. 4), or a lawn sweeper attachment 26 (FIG. 5). The housing 20 includes a curved back plate 28, a first side plate 30 which is permanently fixed to the back plate 28 to close one side of the housing, and a second side plate 32. The side plate 32 is removably secured (in a manner to be described) to the back plate 28 to close the other side of the housing 20.

The first or fixed side plate 30 carries a sprocket 34 which is used to drive the tool selected for use in the device. The manner in which the sprocket 34 is journalled on the side plate 30 is best shown in FIG. 6. As illustrated in FIG. 6, the side plate 30 is fitted with a cylindrical stub shaft 36 welded to the side plate 30. An annular bushing 38 is rotatably fitted over the stub shaft 36 for rotation thereon. The bushing 38 may be slid off the stub shaft 36 for lubrication or replacement as required. The sprocket 34 includes a central laterally inwardly projecting axial hub 40 having a cylindrical axial aperture 42 therein so that the sprocket may be rotatably fitted over the bushing 38. The sprocket 34 is held clear of the side plate 30 by a flange 44 on the busing 38.

The hub 40 of the sprocket 34 includes a square hole 46 in its inner face, to accommodate the end of the tool being used in the device. As shown in FIGS. 3, 4 and 5, each of the tools 22, 24, 26 includes a central axial shaft 50 having a square end 52 which fits within the square hole 46 of the sprocket. The diagonal dimension of the square hole 46 in the sprocket is relatively large, typically one inch, so that the required drive forces can be transmitted to the tool being used. Driving power is supplied to the sprocket 34 and hence to the tool via a chain 54 (FIG. 2) which extends through a hole 56 in the back plate 28 and is connected behind the back plate to the motor (not shown).

The removable side plate 32 includes a central axial hub 58 (FIGS. 2, 7) welded thereto to accommodate the other end of the shaft 50 of the attachment tools. As shown in FIGS. 3, 4 and 5, the shaft 50 of the attachment tools 22, 24, 26 includes a reduced diameter outwardly projecting cylindrical stub shaft 60 at its end. The stub shaft 60 is accommodated (see FIG. 7) in a cylindrical hole 62 in the hub 58 of the removable side plate 32. The hub 58 thereby acts as a bushing; appropriate bearings may be provided in it if desired.

The removable side plate 32 is secured to the remainder of the housing 20 in the following manner. A number of studs 64 (FIG. 2) are welded to the front surface of the back plate 28 and project laterally outwardly therefrom. The removable side plate 32 contains a number of holes 66 which match the locations of the studs 64. Wing nuts 68 are provided for the studs and are tightened, once the side plate 32 is in position, to hold the side plate 32 in place. To remove the side plate 32, the wing nuts 68 are simply removed, and then the side plate 32 is pulled laterally outwardly in the direction of arrow A, FIGS. 2, 7, to remove it from the housing 20. The hub 58 of the side plate 32 simply pulls off the stub shaft 60 of the attachment tool which happens to be in the machine at the time. When the end of the attachment tool, for example the snow blower reel 22, has been exposed, the entire reel 22 may then be withdrawn from the machine by pulling it in the direction of arrow A, pulling the square end 52 of the shaft 50 from the square hole 46 in the sprocket 34.

To reverse the procedure, the square end 52 of shaft 50 of the tool in question is inserted into the square hole 46 in the sprocket; the side plate 32 is then moved into position with the cylindrical stub shaft 60 of the attachment in position in the hole 62 of hub 58 and with the studs 64 projecting through the holes 66, and then the wing nuts 68 are tightened. The side plate 32 includes a laterally inwardly projecting flap 70 which overlies the edge of the back plate 28 of the housing along the entire side edge of the back plate, to provide a better seal for the housing, and also to provide additional support for the side plate.

It will be appreciated that since the attachment tool in the unit turns at relatively high speed, fairly accurate alignment of the square sprocket hole 46 and the hole 62 in the hub 58 is required. This accurate alignment is provided by the studs 64 on the back plate 28 and the holes 66 in the side plate 32. Since the side plate 32 bears against the back plate 28 around approximately 180° or more of its periphery, the connection is rigid and well able to accept the stresses imposed on it.

Most devices of the kind described are provided with front wheels so that their operating height in relation to the ground will not vary as they are operated. The front wheel 16b shown in the drawings is mountd in a conventional manner on the fixed side plate 30. The other front wheel 16a is mounted on the removable side plate 32. The front wheels may typically be made adjustable as to height, and for this purpose each front wheel is mounted on a shaft 74 which in turn projects from an arm 76 journalled at 78 to its side plate. Each arm 78 may be swung about the arc indicated by arrow B, FIG. 2, by means of a further arm 80 connected at one end to the arm 78. Each arm 80 is adjustably secured at its other end to the side plate by a wing nut 82 and a bolt 84 which extends through a slot (not shown) in the side plate. This form of wheel height adjustment is conventional.

It will be seen that when the removable side plate 32 is removed, the wheel 16a thereon is removed with it, but the wheel height admustment is not disturbed when the side plate 32 is removed or replaced.

When the machine is used as a lawn mower or lawn sweeper, the front of the housing 20 will normally be closed. This is accomplished by a removable front cover 90 best shown in FIG. 8. The cover 90 has generally the form of a shallow box, and is adapted to enclose the entire front of the housing 20 while clearing the lawn mower reel 24, the lawn sweeper attachment 26, or other tool located in the housing. The front cover 90 is secured to the housing 20 as follows.

The sides 92 of the front cover 90 include narrow slots 94 in their edges. Studs 96 (FIG. 2) are welded to the side plates 30, 32 and project through the slots 94 when the cover 90 is in place. Wing nuts 98 are tightened down on washers (not shown) to hold the cover 90 in place after it has been positioned. For added support, the top side 100 of the cover 90 includes further slots 102 which accommodate studs 104 (FIG. 2) welded to and projecting upwardly from the upper edge of the back plate 28. Wing nuts 106 again are tightened down against washers (not shown) on the studs 104 to help hold the top of the cover 90 in place. For still further security, tabs 108 (FIG. 8) at the top side 100 of the cover 90 fit into narrow slots 110 (FIG. 2) between the motor cover 18 and the back plate 28 of the housing 20.

When the machine is used as a snow blower, a standard central exit chute 112 is provided, at the top of the housing 20. A conventional deflector 114 may be provided, operated by a handle 116, as shown in FIGS. 9 and 10. The handle 116 includes a standard detent 118 to locate the snow deflector in the desired position.

When the machine is used as a lawn mower or lawn sweeper, it may be desired to collect the material removed by the machine. Collection is difficult from the central exit chute 112. Therefore, the fixed side plate 30 may be provided with an aperture 120 to accommodate a laterally projecting exit chute 122 (FIG. 8) extending from the side of and forming part of the cover 90. A porous grass catcher bag (not shown) may be secured to the exit chute 122 by means not shown. In case it is desired to use a non-porous grass catching bag, an air release tube 124 may be provided, welded to one corner of the exit chute 122 as shown, and the non-porous bag may be secured over the exit chute 122 and air release tube 124.

When a side mounted refuse collector is mounted on the cover 90, it will be undesirable to allow material to exit through the snow blower chute 112. Accordingly, the cover 90 is provided with an upwardly projecting flap 130, FIGS. 8, 10, which extends into the snow blower chute 112 and closes off this chute so long as the front cover 90 is in position. The flap 130 is simply an upward extension from the edge of the top side of the cover 90.

It will be appreciated that various changes may be made in the embodiment described. For example, the studs used to connect the side plate to the remainder of the housing may be differently positioned, or alternative means may be used to connect the side plate 32 to the remainder of the housing 20. The stub shaft 60 can be connected to the side plate 32 by a pin so that the side plate 32 must be removed before the tool can be disconnected from it. The side plate 32 can be made removable in a direction which is not lateral, if a universal joint or the like is included in the connection between the tool and the sprocket 34, to allow the necessary play. In place of the square ended shaft 50 and the square hole 46 in the sprocket 34, the attachment tool may be provided with a square hole at one end thereof and the sprocket 34 may be provided with a square ended projecting stub shaft. Alternatively, keys may be used to provide a sliding connection which transmits rotary movement.

The attachment tools 22, 24, 26 shown in FIGS. 3, 4 and 5 may take various forms. The snow blower reel 22 is shown as a conventional snow blower reel, having the usual spiral blade 140. The lawn mower reel 24 of FIG. 4 is not conventional, and consists of straight blades 142 secured to the shaft 50 by radial arms 143. The blades 142 have sharpened leading edges 144 so that their speed of rotation severs grass with which they come into contact. The lawn sweeper attachment 26 is conventional and simply includes radially projecting fingers 146 connected to the shaft 50 and which extend into and sweep debris out of the grass as the shaft 50 is rotated.

If desired, for snow blowing applications the front wheels 16a, 16b may be replaced by short runners or skis (not shown). Alternatively, runners or skis may be pivoted to the side plates 30, 32 so that they can be swung down into position beneath the wheels 16a, 16b when needed.

What I claim as my invention is:

1. A multi-use lawn care machine comprising:
    a. a tool housing comprising a back plate, a first fixed side plate closing one side of said housing, and a second side plate closing the other side of said housing,
    b. a pair of wheels, one mounted on said first side plate and one mounted on said second side plate,
    c. a rotary attachment tool in said housing, said attachment tool having a central longitudinal axis of rotation, and first and second ends aligned with said axis,
    d. drive means mounted on said first side plate and supporting and driving said first end of said tool, said first end of said tool and said drive means containing co-operating means for transmitting rotary drive motion from said drive means to said tool and for permitting disconnection of said first end of said tool from said drive means in a lateral direction towards said second end,
    e. means removably connecting said second side plate to said housing for disconnection of said second side plate from said housing in a laterally outward direction,
    f. said second side plate including bearing means aligned with said axis and rotatably supporting said second end of said tool, said bearing means being removable from said second end of said tool in a laterally outward direction to permit said lateral disconnection of said second side plate,
    g. and means for applying power to said drive means; whereby said tool may be changed by removing said second side plate, with said second wheel thereon, from said housing in said laterally outward direction and then removing said tool in the same direction from said housing.

2. A machine according to claim 1 including a front cover for enclosing the front of said housing, and means for removably connecting said front cover to said housing.

3. A machine according to claim 1 wherein said drive means includes a drive sprocket mounted on said first sideplate, said drive sprocket having a central hub having a square hole therein, said first end of said tool being a square ended stub shaft, said square ended stub shaft being dimensioned to fit snugly within said square hole.

4. A machine according to claim 1 wherein said means (e) comprises a plurality of studs secured to said back plate and projecting laterally outwardly, said second side plate having a plurality of holes therein for penetration by said studs when said second side plate is in position on said housing.

5. A machine according to claim 1 wherein said tool is a lawn mower reel having a plurality of circumferentially spaced laterally extending straight blades.

6. A machine according to claim 2 wherein said tool is a snow blower reel.

7. A machine according to claim 1 wherein said tool is a lawn sweeper brush.

* * * * *